United States Patent
Farnham (10) Patent No.: US 10,404,535 B2
(45) Date of Patent: Sep. 3, 2019

(54) METHOD FOR MANAGING THE CONFIGURATION OF A WIRELESS CONNECTION USED TO TRANSMIT SENSOR READINGS FROM A SENSOR TO A DATA COLLECTION FACILITY

(71) Applicant: KABUSHIKI KAISHA TOSHIBA, Minato-ku (JP)

(72) Inventor: Timothy David Farnham, Bristol (GB)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/550,953

(22) PCT Filed: Dec. 11, 2015

(86) PCT No.: PCT/GB2015/053872
§ 371 (c)(1),
(2) Date: Aug. 14, 2017

(87) PCT Pub. No.: WO2017/098193
PCT Pub. Date: Jun. 15, 2017

(65) Prior Publication Data
US 2018/0034694 A1 Feb. 1, 2018

(51) Int. Cl.
*H04W 4/00* (2018.01)
*H04L 12/24* (2006.01)
(Continued)

(52) U.S. Cl.
CPC ...... *H04L 41/0816* (2013.01); *H04L 41/0672* (2013.01); *H04L 41/0836* (2013.01);
(Continued)

(58) Field of Classification Search
None
See application file for complete search history.

(56) References Cited

U.S. PATENT DOCUMENTS 6,973,622 B1  12/2005  Rappaport et al.
7,275,017 B2   9/2007  Dini et al.
(Continued)

FOREIGN PATENT DOCUMENTS

JP  2008-234361 A  10/2008
JP  2010-187316 A   8/2010
(Continued)

OTHER PUBLICATIONS

Linquan Xie, et al., "An Anomaly Detection Method Based on Fuzzy C-means Clustering Algorithm", Proceeding of the Second International Symposium on Networking and Network Security (ISNNS '10), Apr. 2010, pp. 89-92.
(Continued)

*Primary Examiner* — Farah Faroul
(74) *Attorney, Agent, or Firm* — Oblon, McClelland, Maier & Neustadt, L.L.P.

(57) ABSTRACT

A method for managing the configuration of a wireless connection used to transmit sensor readings from a sensor to a data collection facility, the method comprising receiving a sensor reading from the sensor, comparing the value of the sensor reading with a forecast value for the sensor reading, determining the value of a normality parameter for the sensor, wherein the value of the normality parameter defines the extent to which the value of the sensor reading differs from the forecast value; and determining whether to retain a current configuration of the wireless connection between the sensor and data collection facility or to change the configuration, wherein the determination to retain the current configuration or change configuration is based at least in part on the value of the normality parameter.

15 Claims, 10 Drawing Sheets

(51) Int. Cl.
*H04W 4/38* (2018.01)
*H04W 76/25* (2018.01)
*H04L 29/08* (2006.01)

(52) U.S. Cl.
CPC .......... *H04L 41/142* (2013.01); *H04L 41/147* (2013.01); *H04W 4/38* (2018.02); *H04W 76/25* (2018.02); *H04L 41/0823* (2013.01); *H04L 67/12* (2013.01)

(56) References Cited

U.S. PATENT DOCUMENTS

| | | | |
|---|---|---|---|
| 7,693,982 B2 | 4/2010 | Goldszmidt et al. | |
| 2004/0068496 A1 | 4/2004 | Bergman et al. | |
| 2005/0208935 A1* | 9/2005 | Mountney | H04W 16/14 455/422.1 |
| 2005/0265321 A1 | 12/2005 | Rappaport et al. | |
| 2008/0250301 A1 | 10/2008 | Mukhopadhyay et al. | |
| 2010/0141416 A1* | 6/2010 | Kukshya | B60C 23/0408 340/447 |
| 2013/0328697 A1* | 12/2013 | Lundy | G08C 17/02 340/870.16 |
| 2014/0051449 A1* | 2/2014 | Yerrabommanahalli | H04W 36/30 455/437 |
| 2014/0269223 A1* | 9/2014 | Mokhnatkina | G04G 13/02 368/73 |
| 2014/0293777 A1* | 10/2014 | Dhillon | H04W 28/0231 370/230 |
| 2014/0372577 A1 | 12/2014 | Hui et al. | |
| 2015/0166072 A1* | 6/2015 | Powers | B60W 40/06 701/1 |
| 2015/0332523 A1 | 11/2015 | Ranasinghe et al. | |
| 2015/0334768 A1 | 11/2015 | Ranasinghe et al. | |
| 2015/0371151 A1* | 12/2015 | Georgescu | G05B 23/0221 706/12 |
| 2016/0198414 A1 | 7/2016 | Yano et al. | |
| 2016/0345269 A1* | 11/2016 | Basehore | H04W 52/0254 |
| 2017/0069144 A1* | 3/2017 | Lawrie-Fussey | G07C 5/085 |

FOREIGN PATENT DOCUMENTS

| | | |
|---|---|---|
| JP | 2010-206596 A | 9/2010 |
| WO | WO 02/27564 A1 | 4/2002 |
| WO | WO 2005/094493 A2 | 10/2005 |
| WO | WO 2014/205073 A1 | 12/2014 |
| WO | WO 2015/059834 A1 | 4/2015 |

OTHER PUBLICATIONS

International Search Report and Written Opinion dated Aug. 8, 2016 in PCT/GB2015/053872.

H. H. W. J. Bosman, et al., "Online Fusion of Incremental Learning for Wireless Sensor Networks", IEEE International Conference on Data Mining Workshop, XP032729789, Dec. 14, 2014, pp. 525-532.

Linquan Xie. et al., "An Anomaly Detection Method Based on Fuzzy C-means Clustering Algorithm", Proceedings of the Second International Symposium on Networking and Network Security (ISNNS '10), Apr. 2010, pp. 89-92.

Abhishek B. Sharma, et al., "Sensor Faults Detection Methods and Prevalence in Real-World Datasets"; ACM Transactions on Sensor Networks (TOSN); vol. 6, No. 3, Jun. 2010, 40 pages.

John Keeney, et al., "Extending a Knowledge-based Network to support Temporal Event Reasoning" Proceedings of the 12th IEEE/IFIP Network Operations & Management Symposium (NOMS 2010), Osaka, Japan, Apr. 19-23, 2010, pp. 1-8.

\* cited by examiner

Example severity vs normality for meter data (a) model "A"; (b) model "B"

METHOD FOR MANAGING THE CONFIGURATION OF A WIRELESS CONNECTION USED TO TRANSMIT SENSOR READINGS FROM A SENSOR TO A DATA COLLECTION FACILITY

FIELD

Embodiments described herein relate to a method for managing the configuration of a wireless connection used to transmit sensor readings from a sensor to a data collection facility.

BACKGROUND

Decision support systems have been employed to assist the operational management of complex infrastructures, including those used in supply and distribution of various utilities (gas, water, electricity etc.). These systems use data supplied by various sensors, together with historic data, to make predictions about the infrastructure and to identify any need for intervention. For instance, support vector machines can be used for demand forecasting in a utility network. In such systems, detecting anomalies, both in terms of the actual measurements reported, and the timing at which such reporting takes place (or fails to take place) is an important requirement.

Typically, the readings from the various sensors will be transmitted over a wireless communication network to a central processing facility for analysis. Where issues of wireless connectivity or interference arise in the wireless network, sensor readings may be delayed in reaching the central processing facility, or may be missed entirely. As a result, the accuracy of subsequent predictions becomes worse and the ability to detect anomalies is compromised. It is, therefore, desirable to dynamically optimise the configuration of the wireless communications network, in such a way as to ensure that anomalous events do not go unnoticed.

BRIEF DESCRIPTION OF DRAWINGS

Embodiments of the invention will now be described by way of example with reference to the accompanying drawings in which.

DETAILED DESCRIPTION

According to a first embodiment, there is provided a method for managing the configuration of a wireless connection used to transmit sensor readings from a sensor to a data collection facility, the method comprising:
(i) receiving a sensor reading from the sensor;
(ii) comparing the value of the sensor reading with a forecast value for the sensor reading;
(iii) determining the value of a normality parameter for the sensor, wherein the value of the normality parameter defines the extent to which the value of the sensor reading differs from the forecast value; and
(iv) determining whether to retain a current configuration of the wireless connection between the sensor and data collection facility or to change the configuration, wherein the determination to retain the current configuration or change configuration is based at least in part on the value of the normality parameter.

In some embodiments, the step of determining whether to retain the current configuration of the wireless connection or to change the configuration further comprises:
obtaining a reliability forecast for the current configuration of the wireless connection, the reliability forecast indicating the likelihood of delays in receiving subsequent sensor readings from the sensor.

In some embodiments, the step of determining whether to retain the current configuration of the wireless connection or to change the configuration further comprises:
determining the value of a reliability parameter for the connection by comparing the arrival time of the sensor reading with a forecast arrival time, the reliability parameter defining the extent to which the arrival time differs from the forecast arrival time.

In some embodiments, in the event that the normality parameter indicates that the difference between the value of the received sensor reading and the forecast value for the sensor reading is above a first threshold, and the reliability parameter indicates that the difference between the arrival time of the sensor reading and the forecast arrival time is above a second threshold, the configuration of the wireless connection is changed.

In some embodiments, the method comprises:
forecasting arrival times for subsequent sensors reading from the sensor;
in the event that one or more of the sensor readings are not received at the forecast times, estimating value(s) for the sensor readings that have not been received, the estimated readings being based on the values of the last sensor readings to have been received from the sensor; and
carrying out steps (ii) to (iv) on the basis of the estimated sensor value(s).

In some embodiments, the method comprises carrying out the steps (i) to (iv) for each one of a plurality of sensors.

In some embodiments, the respective wireless connections between the sensors and the data collection facility comprise part of a wireless network, and the method comprises:

identifying those sensors for which:
  the difference between the value of the received sensor reading and the forecast value for the sensor reading is above a first threshold and/or
  the difference between the arrival time of the sensor reading and a forecast arrival time is above a second threshold;
for each identified sensor, logging the value of the normality value and a reliability parameter, wherein the value of the reliability parameter defines the extent to which the arrival time differs from the forecast arrival time;
identifying, based on the logged values, one or more regions in the wireless network that include multiple sensors whose wireless connection to the data collection facility requires a change in configuration; and
adjusting the configuration of the wireless network in the one or more regions, so as to effect the changes to the wireless connections of said multiple sensors.

In some embodiments, identifying the one or more regions in the wireless network comprises performing a clustering algorithm on the logged values; and identifying geographic regions associated with the clusters of logged values.

In some embodiments, changing the configuration of a wireless connection comprises selecting a configuration having a higher reliability forecast than that of the current configuration, the reliability forecast indicating the likelihood of delays in receiving subsequent sensor readings from the sensor when using a particular configuration.

In some embodiments, changing the configuration comprises adjusting the bandwidth and/or power allocated to the wireless connection between the sensor and the data collection facility.

In some embodiments, changing configuration comprises re-routing communication between the sensor and data collection facility, such that sensor readings are routed to the data collection facility via a different path in a wireless communication network.

In some embodiments, changing configuration comprises utilising a different frequency, channel allocation or modulation scheme for the wireless connection.

In some embodiments, changing configuration comprises changing the reporting interval for the sensor readings.

In some embodiments, the sensor readings comprise measures of utility usage at one or more locations.

According to a second embodiment, there is provided a computer readable medium comprising computer executable instructions that when executed by one or more computer processors will cause the computer to carry out a method according to the first embodiment.

According to a third embodiment, there is provided a computer system comprising:
  one or more processors; and
  a non-transitory computer readable medium comprising computer executable instructions that when executed by the one or more computer processors will cause the computer to carry out a method according to the first embodiment.

Embodiments described herein seek to identify optimisations to a sensor network communication infrastructure, by considering the correlation of the data reported by the sensors with different forecasting and wireless network models. In particular, embodiments seek to quantify the normality of the received data compared with different prediction models (such as analytical models and simulation models) and combine this with the reliability of the wireless data transfer. It will be understood that the term "normality" as used herein refers to whether or not the received data values fall within bounds predicted by the model(s), whilst the "reliability" refers to the performance of the wireless network and in particular, whether or not the communication link between the sensor and data collection facility is able to achieve a satisfactory rate of data transfer; in other words, the reliability reflects the likelihood of delays occurring in receiving readings from the sensor. The measures of normality and reliability can then be used to optimise the wireless communication infrastructure by selecting the most appropriate configurations based on network and wireless model predictions.

Embodiments can be used in conjunction with the knowledge based networking paradigm in which content delivery is optimised based on knowledge of the content being delivered. Embodiments can help to optimise the reliability of data delivery based on the predictability (or normality) of the content.

Embodiments will now be described by reference to FIGS. 1, 2 and 3. For purpose of comparison, FIG. 1 shows a schematic of a conventional decision support system, whilst FIGS. 2 and 3 each show a system according to an embodiment.

Figure 1:
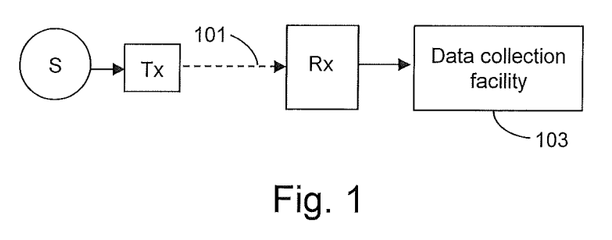
FIG. 1 shows a schematic of a conventional decision support system.

Referring first to FIG. 1, there is shown a sensor S that is used to monitor one or more variables. The variable(s) in question may reflect usage of a particular utility; for example, the sensor may be a water meter, gas meter, electricity meter, etc. The sensor has an associated transmitter (Tx), which is used to transmit the sensor readings from the sensor to a receiver (Rx) via a wireless communication link 101. The sensor is automated to carry out readings, and in turn transmit those measurements to the receiver, at predetermined intervals. The readings are forwarded from the receiver to a data collection facility 103 where the data can be analysed. The data collection facility may take the form of a computer server, for example.

Figure 2:
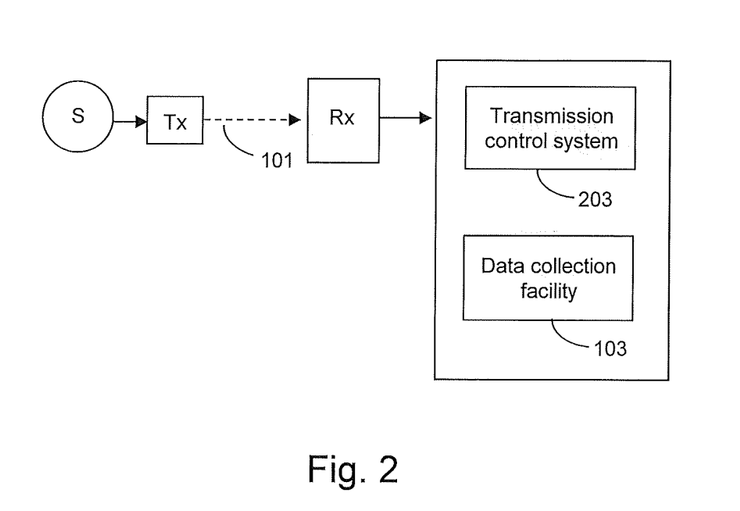
FIG. 2 shows a schematic of a system according to an embodiment.

The system shown in FIG. 2 has similar components to those shown in FIG. 1, but also includes a transmission control system 203 that is used to mediate transmission of signals from the sensor S to the data collection facility. In the embodiment shown in FIG. 2, the transmission control system 203 is provided in conjunction with the data collection facility on the other side of the wireless communication link. However, it will be understood that the transmission control system may be located at any one of a number of locations, provided it has access to data from the sensor and/or data collection facility.

Figure 3:
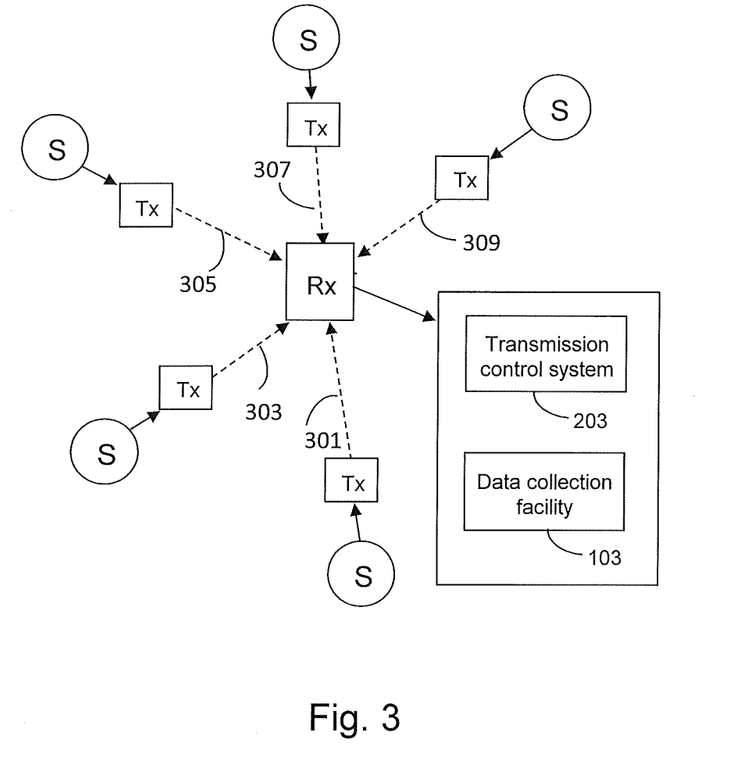
FIG. 3 shows a schematic of a system according to another embodiment.

FIG. 3 shows an embodiment in which the data collection facility 103 receives sensor readings from a plurality of sensors, each of which communicates data to the data collection facility via a respective wireless communication link 301-309. As in FIG. 2, a transmission control system 203 is provided at the receiver end, in communication with the data processing facility.

Figure 4:
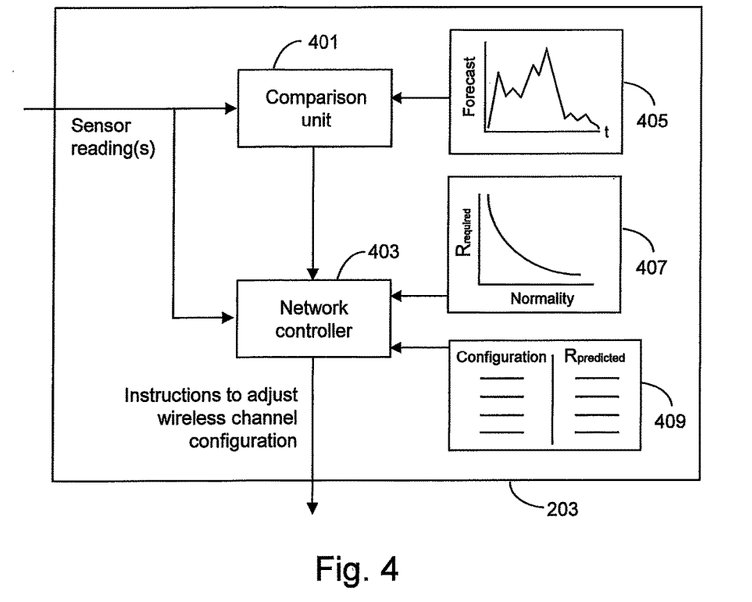
FIG. 4 shows an example of a transmission control system according to an embodiment.
Figure 5:
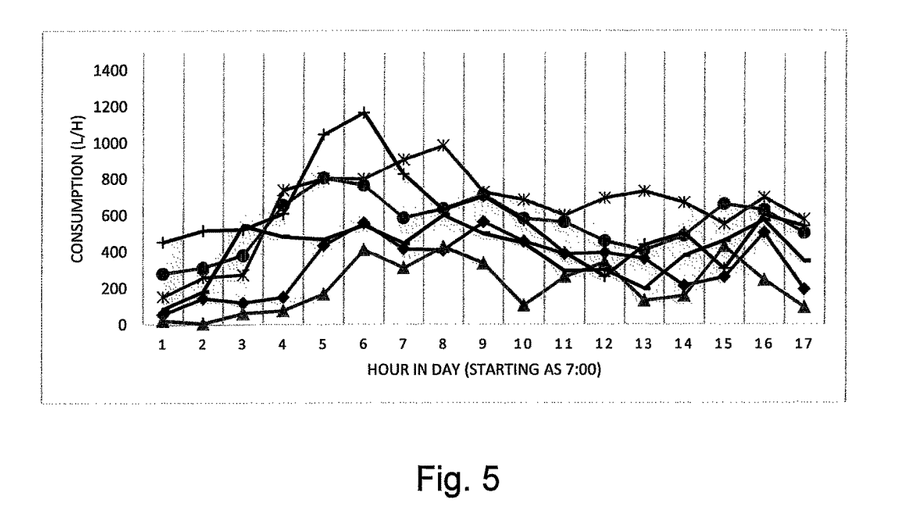
FIG. 5 shows example sensor readings obtained from a plurality of sensors across a 24 hour period.
Figure 6:
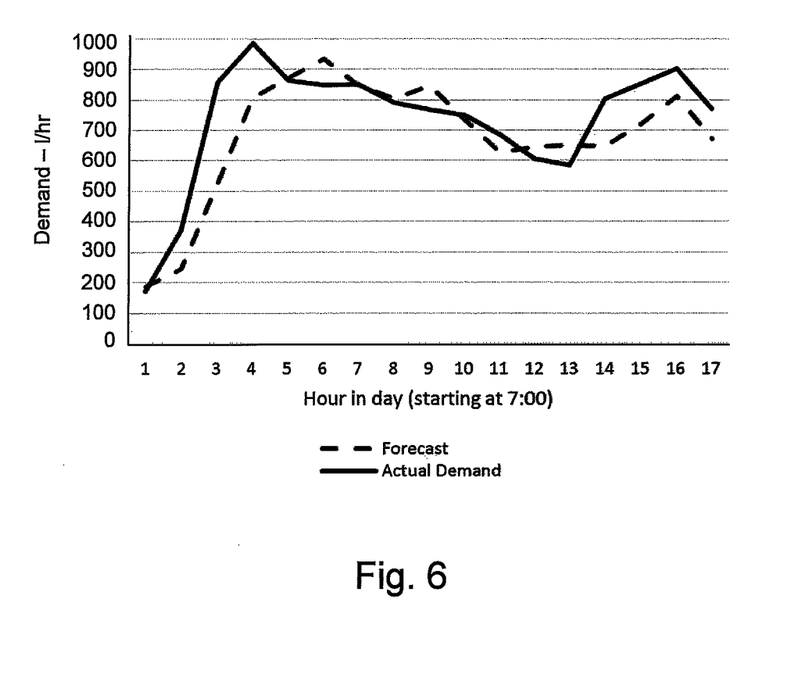
FIG. 6 shows a comparison between readings obtained from an individual sensor and a forecast for the sensor readings over a 24 hour period.

The components of the transmission control system 203 are shown in more detail in FIG. 4. The transmission control system includes a comparison unit 401 and a network controller 403. In use, the comparison unit 401 receives a sensor reading from a sensor, and compares the reading with a sensor readings forecast model 405. The sensor readings forecast model defines expected values for sensor readings at different time points and may be generated based on prior readings obtained from the sensor or as an average of sensor readings obtained from a plurality of sensors. As an example, FIG. 5 shows sensor readings received from different sensors over a 24 hour period, whilst FIG. 6 shows a comparison between the readings obtained from a single sensor and the sensor readings forecast model for that one sensor.

Referring back to FIG. 4, the sensor readings forecast model 405 may be stored in memory, or may be generated spontaneously by the comparison unit. Different models may be used depending on the time of week (e.g. weekday or weekend) and the current season, for example.

The comparison unit uses the comparison between the sensor reading and the value forecast in the sensor readings forecast model 405 to determine the value of a normality parameter, where the normality parameter defines the extent to which the received sensor reading corresponds with that predicted by the sensor readings forecast model. In an example embodiment, the normality parameter is determined as a percentage error in the received sensor reading compared to the predicted value.

The comparison unit outputs the value of the normality parameter to the network controller, which uses it to assess whether or not the present configuration of the wireless communication link is appropriate. In the present embodiment, the network controller determines the minimum reliability required for the wireless communication link, in view of the normality of the sensor readings. To do so, the network controller consults a look up table 407 (depicted graphically in FIG. 4) which shows the required reliability as a function of the normality of the sensor readings. Having established the minimum reliability required, the network controller next determines whether the current configuration for the wireless communication link meets the required degree of reliability. In the present embodiment, the network controller consults a second look-up table 409, which shows the predicted (forecast) reliability for different configurations of the wireless communication link. The closer the received sensor readings are to the sensor readings forecast, the higher the score will be for normality, meaning that fewer readings will be required (and with lower reliability) in order to achieve a certain anomaly detection confidence. Conversely, the more abnormal the values i.e. the greater the deviation between the received sensor readings and the forecast values, the more desirable it is for reliable (and fast) detection of subsequent readings from the sensor.

Based on the second look-up table, the network controller determines whether the current configuration of the wireless communication link provides the minimum reliability required. If the present configuration is not forecast to provide the necessary reliability, the network controller outputs a message to a network controller to adopt a configuration that will provide the necessary degree of reliability.

As an additional check, in the event that the current configuration of the wireless communication link is forecast to offer the required level of reliability, the network controller determines whether the actual performance of the link is consistent with that forecast. To do so, the network controller monitors the arrival time of the sensor readings and compares these with a performance model (not shown in FIG. 4) for the present configuration of the wireless communication link. The performance model defines the expected time(s) of arrival for sensor readings from the sensor.

It will be understood that different wireless configurations will each have their own associated performance model, which the network controller can use to forecast the arrival times of sensor readings when that configuration is in use. The performance models consider the radio propagation, receiver and transmitter configuration and network connectivity of the sensors to the infrastructure. As with the sensor readings forecast models, the performance models can make use of historic data and reliability goals to derive the predictions. Normally predictions are derived from profiles such as time-of-day/day-of-week/month-of-year dependent demands and/or error rates. The performance models are then stored for subsequent use within decision support systems.

The network controller logs the arrival time of the current sensor reading and uses this to determine the time that has elapsed since the last expected arrival time for a sensor reading (i.e. the time difference between the arrival time as forecast by the performance model for the present configuration, and the actual time at which the data from the sensor is received). Using this time difference, the network controller determines a measure of reliability for the wireless configuration.

In general, as the time difference between the expected arrival time of the sensor reading and the actual receipt of the sensor reading increases, the reliability will be seen to fall; the reliability may, therefore, be expressed as a value that scales with the inverse of this time difference. In the event that the measured reliability is determined to fall short of the forecast reliability by some (predetermined) extent, the network controller will again issue instructions to adopt a different configuration for the wireless communication link.

In embodiments described herein, the configuration of the wireless communication link may be adjusted in one or more ways. For example, the reliability of the connection may be enhanced by increasing the amount of bandwidth and/or power allocated to the wireless connection. Alternatively, or in addition, the change in configuration may include utilising a different frequency, channel allocation or modulation scheme for the wireless connection.

In some embodiments, in which the sensor and data collection facility are connected by a wireless communication network, and the wireless communication link forms one part of that network, the change in configuration may be effected by re-routing communication between the sensor and data collection facility. In other words, the sensor readings may be routed to the data collection facility via a different path in the wireless communication network.

In some embodiments, the transmission control system may issue instructions for the sensor to change the interval at which sensor readings are carried out and/or transmitted to the data collection facility.

In embodiments described herein, the transmission control system can help to ensure that reliability of the wireless communication is adapted to the measurement predictability. As a result, the operating costs or battery power consumption can be reduced while still being able to detect anomalies with a required level of confidence.

Embodiments function to select the appropriate configurations based on the expected accuracy of predictions, providing lower reliability when the forecasts are accurate enough to detect anomalies and higher reliability when the accuracy is poor. It will be appreciated that, in some cases, it will be unnecessary to rapidly detect small anomalies that are similar to the expected normal state (i.e. when the prediction models are accurate). Also, certain forecasting models may perform acceptably (i.e. still be able to detect abnormal readings) and by avoiding over-engineering of the sensor network, costs can be kept to a minimum. The most appropriate wireless communication configuration and forecasting models can be selected to provide the required goal of being able to detect/diagnose anomalies.

Figure 7:
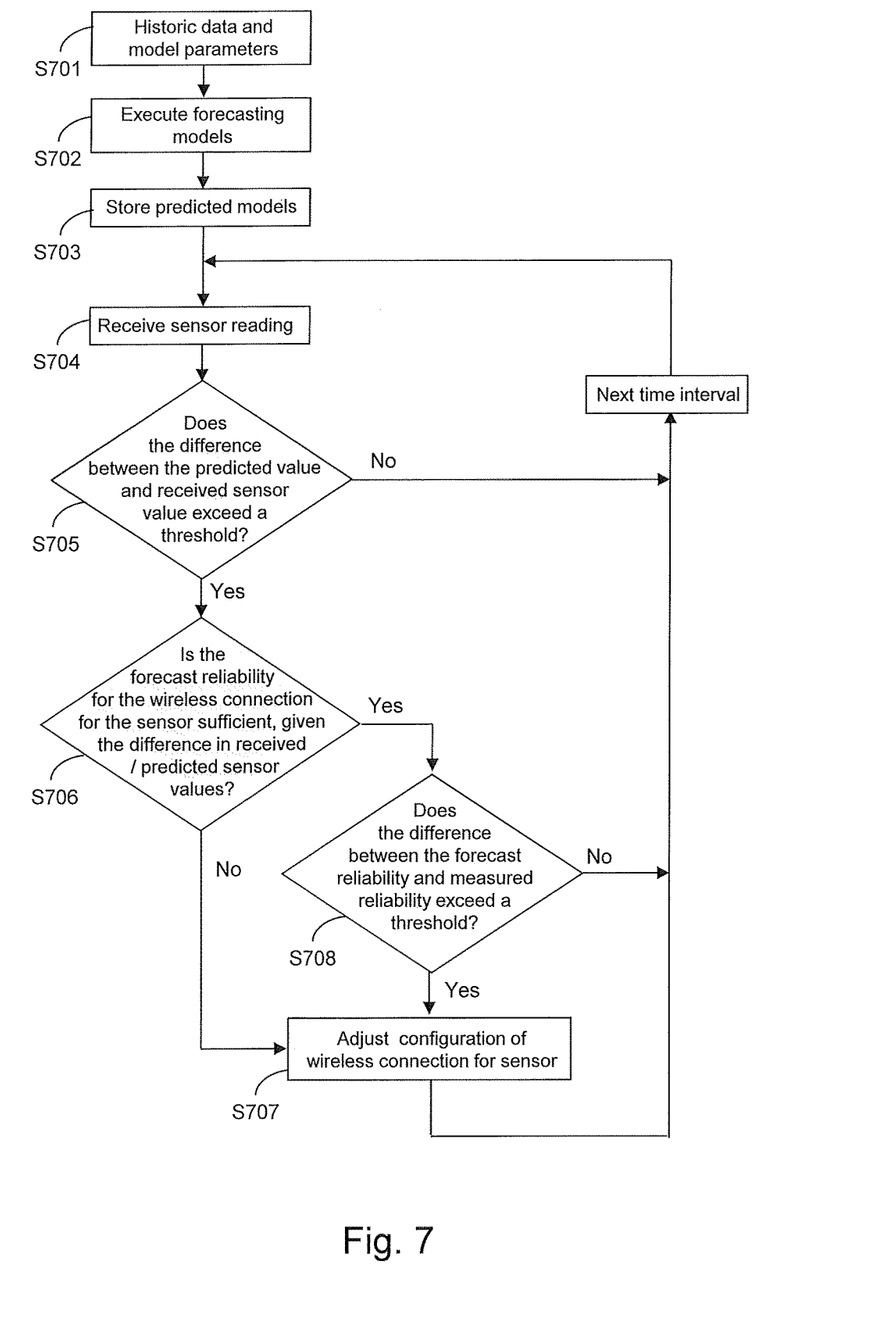
FIG. 7 shows a flow chart of steps carried out in accordance with an embodiment.

FIG. 7 shows a flow chart of steps performed by the transmission control system in an embodiment in which the data collection receives sensor readings from a single sensor (as in the example shown in FIG. 2). In steps S701 to S703, historic sensor data readings for the sensor are loaded into memory, together with the parameters used to generate the sensor readings forecast and the performance forecast for the wireless connection between the sensor and the data collection facility.

In step S704, a reading is received from the sensor and compared against the sensor readings forecast, to determine the value of the normality parameter. If the difference between the sensor reading and the forecast value is within a predefined limit, no action is taken and the network controller simply awaits receipt of the next sensor reading from the sensor (step S705). If the difference between the received reading and the forecast value is above a threshold, the method proceeds to step S706 in which the network controller determines whether the forecast reliability for the present configuration of the wireless communication is sufficient to accommodate the difference i.e. whether or not the forecast reliability is sufficient to ensure that a continued presence of anomalies in the received sensor data will be detected in a timely fashion. If the forecast reliability is not sufficient, the network controller outputs instructions to alter the wireless configuration, so as to move to a more reliable configuration (step S707).

If it is determined in step S706 that the forecast reliability is sufficient, then a check is made as to whether or not the actual measured reliability of the present configuration is consistent with that forecast (step S708). The network controller computes the reliability by comparing the arrival time of the present sensor reading with that predicted by the performance model. If this is found to be within acceptable bounds, the wireless connection is deemed to be performing in accordance with the forecast performance, and so no action is taken to adjust the configuration. However, in the event that the reliability is determined to be inadequate, the network controller sends instructions to alter the configuration of the wireless communication link, so as to move to a more reliable configuration.

Figure 8:
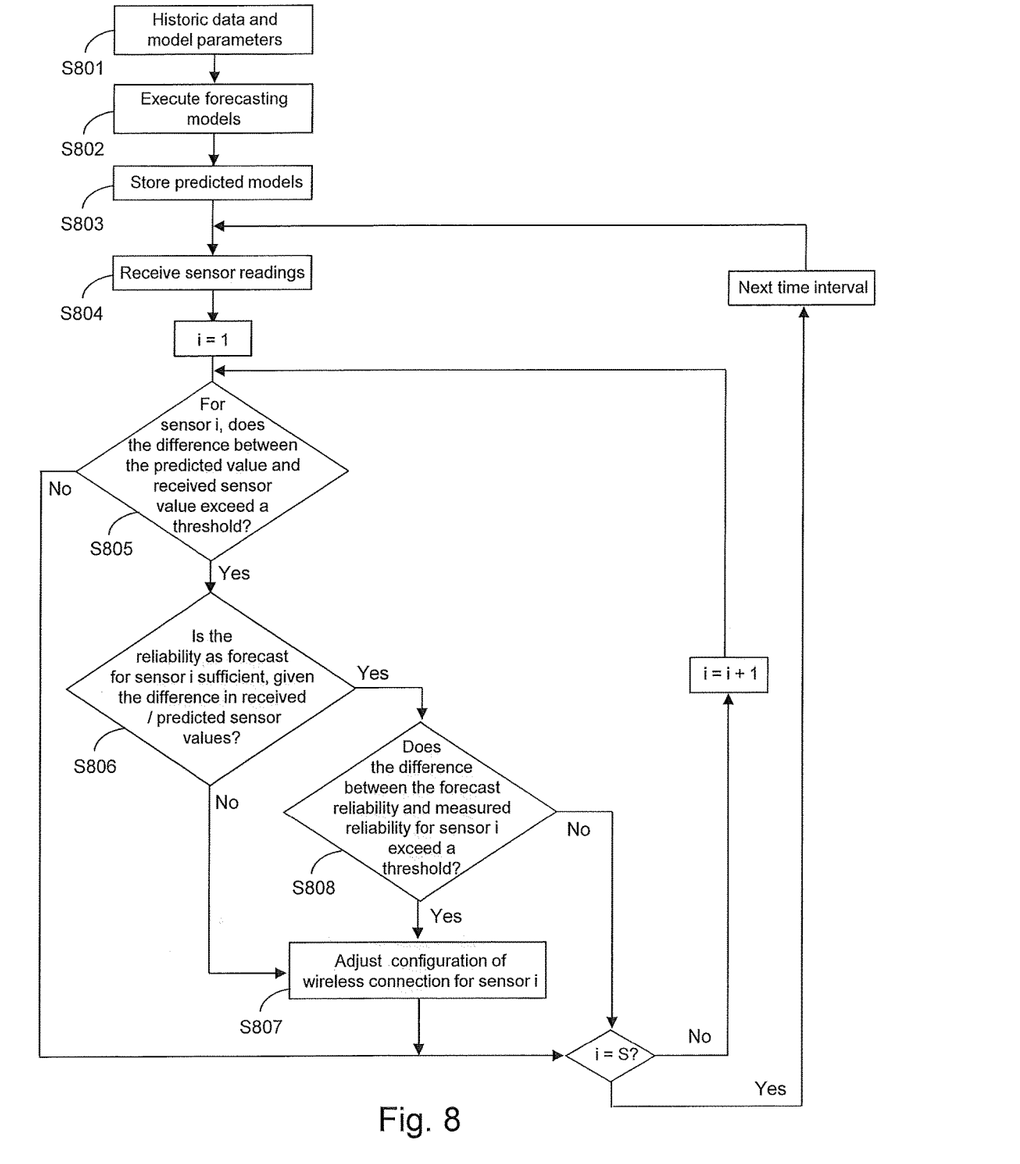
FIG. 8 shows a flow chart of steps carried out in accordance with another embodiment.

FIG. 8 shows a flow chart of steps performed by the transmission control system in an embodiment in which the data collection receives sensor readings from multiple sensors in a network (as in the example shown in FIG. 3). In this example, there are assumed to be a total of S sensors in the network. As shown in FIG. 8, the network controller performs the same steps as described above in relation to FIG. 7, for each one of the individual sensors; that is, at each time interval, the network controller cycles through sensors i=1 . . . S, to determine if their respective wireless communication links meet the required level of reliability when taking into account the deviation in the sensor readings and their respective sensor reading forecast models.

Figure 9:
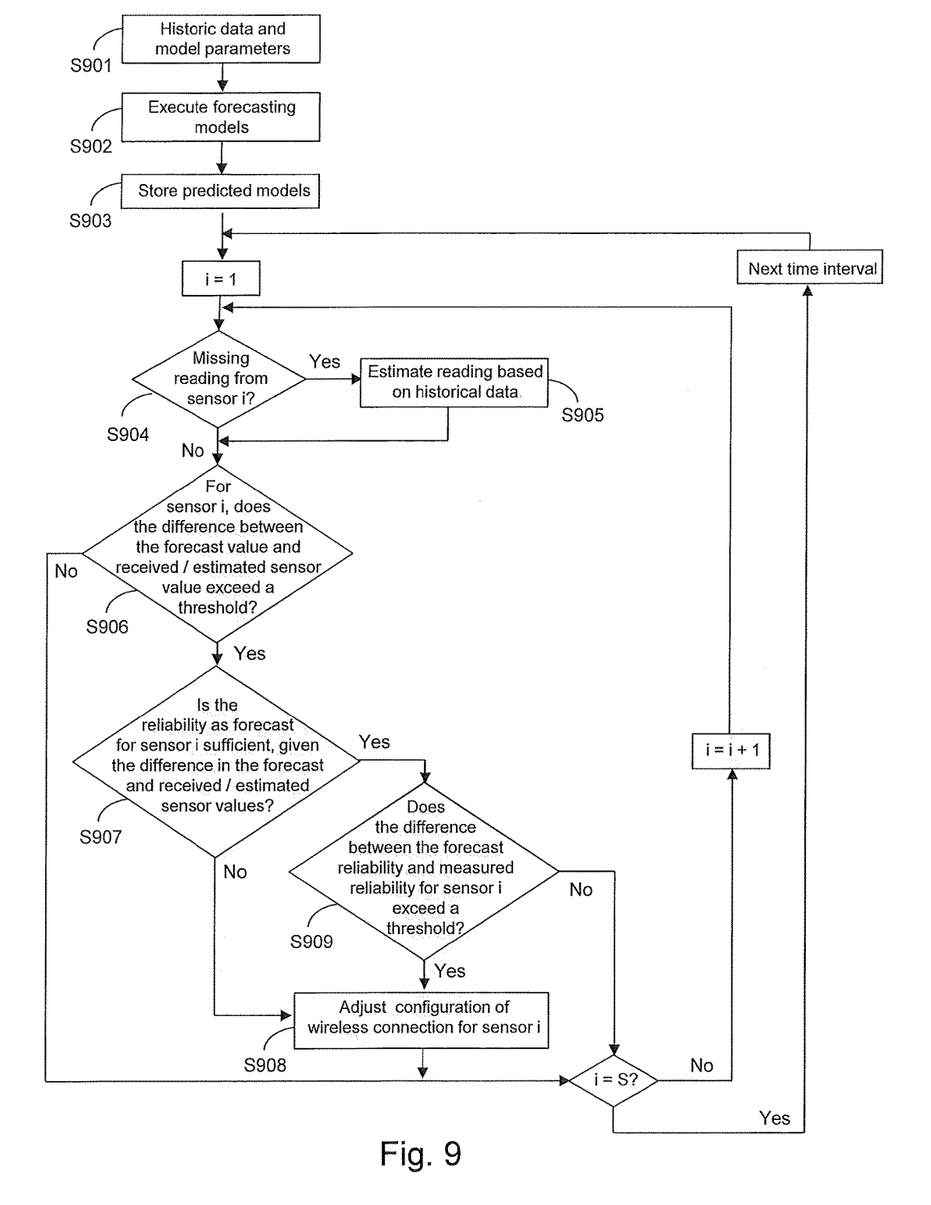
FIG. 9 shows a flow chart of steps carried out in accordance with another embodiment.

FIG. 9 shows a flow chart of steps as performed by the transmission control system in a further embodiment. The present embodiment differs from that shown in FIG. 8 in that, at the start of each time interval, a check is made as to whether or not an (expected) reading has been received from each respective sensor (step S904). If the reading has been received, then the method proceeds as in the embodiment of FIG. 8, by determining the normality of the received sensor reading and if necessary, the reliability of the wireless connection as presently configured. In the absence of a reading having been received in step S904, the transmission control system estimates the sensor reading based on the most recent historical data to have been received from that sensor (step S905). Thus, in the event that previous sensor readings have not shown signs of any anomalous behaviour, the transmission control system will assume that the (missed) reading is still in line with expectations, and is a temporary fault in the network, for which no immediate action need be taken. On the other hand, in the event that recent sensor readings have indicated the presence of an anomaly in the data, the transmission control system will assume that anomaly remains present, until such time as it has received readings to the contrary.

It will be appreciated that a missed reading from the sensor need not necessarily result in the wireless configuration being changed; the performance model for the present configuration may be used to estimate the likely frequency of missing messages from each sensor due to radio propagation effects, such as attenuation and interference, and provided that the failure to receive a sensor reading in a particular time interval is in line with expectations for the present wireless configuration, and the forecast performance of that configuration is still considered adequate in view of the difference between the (estimated) sensor reading and the forecast sensor reading, no action need be taken to adjust the wireless configuration for that sensor.

Figure 10:
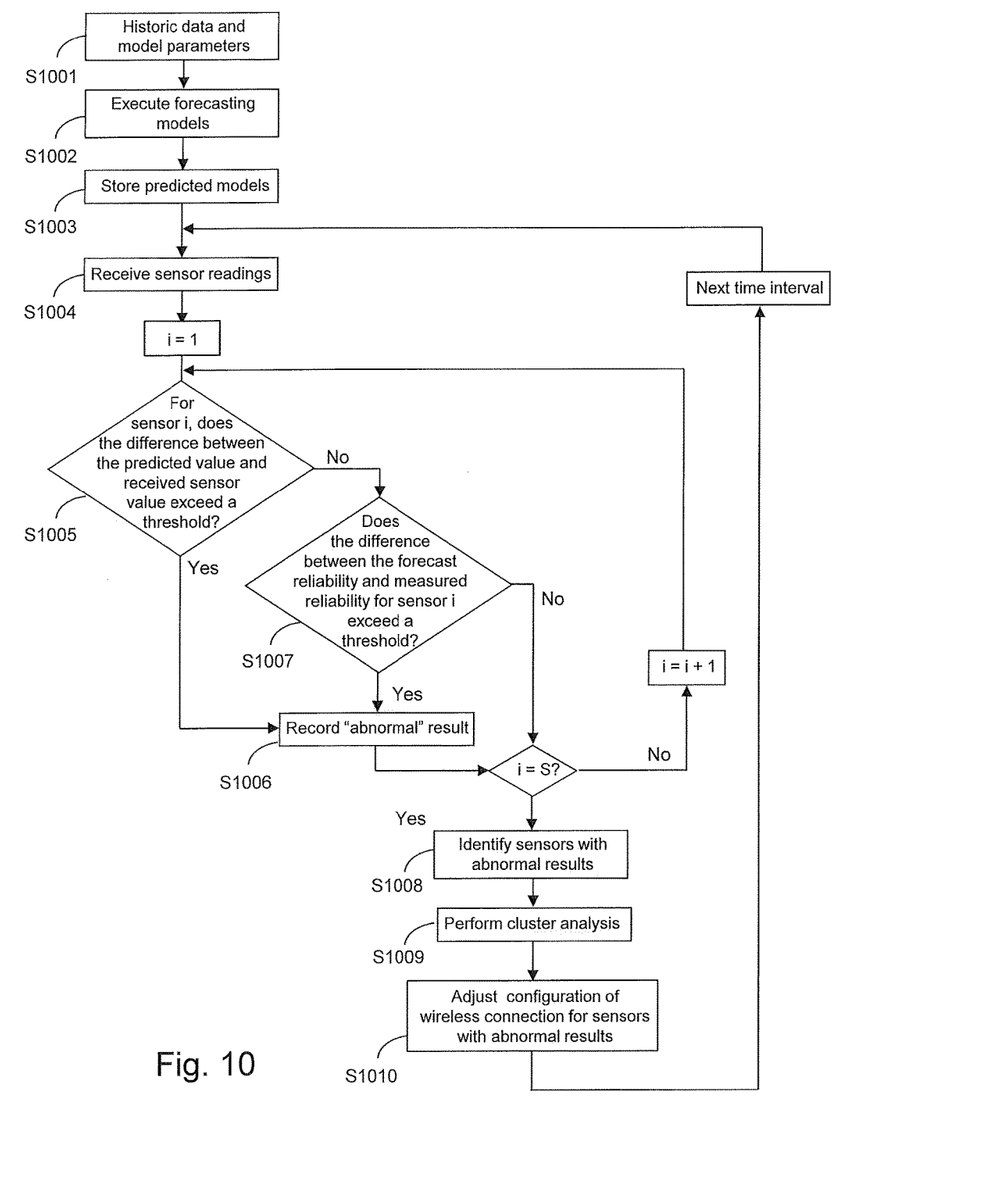
FIG. 10 shows a flow chart of steps carried out in accordance with another embodiment.
Figure 11:
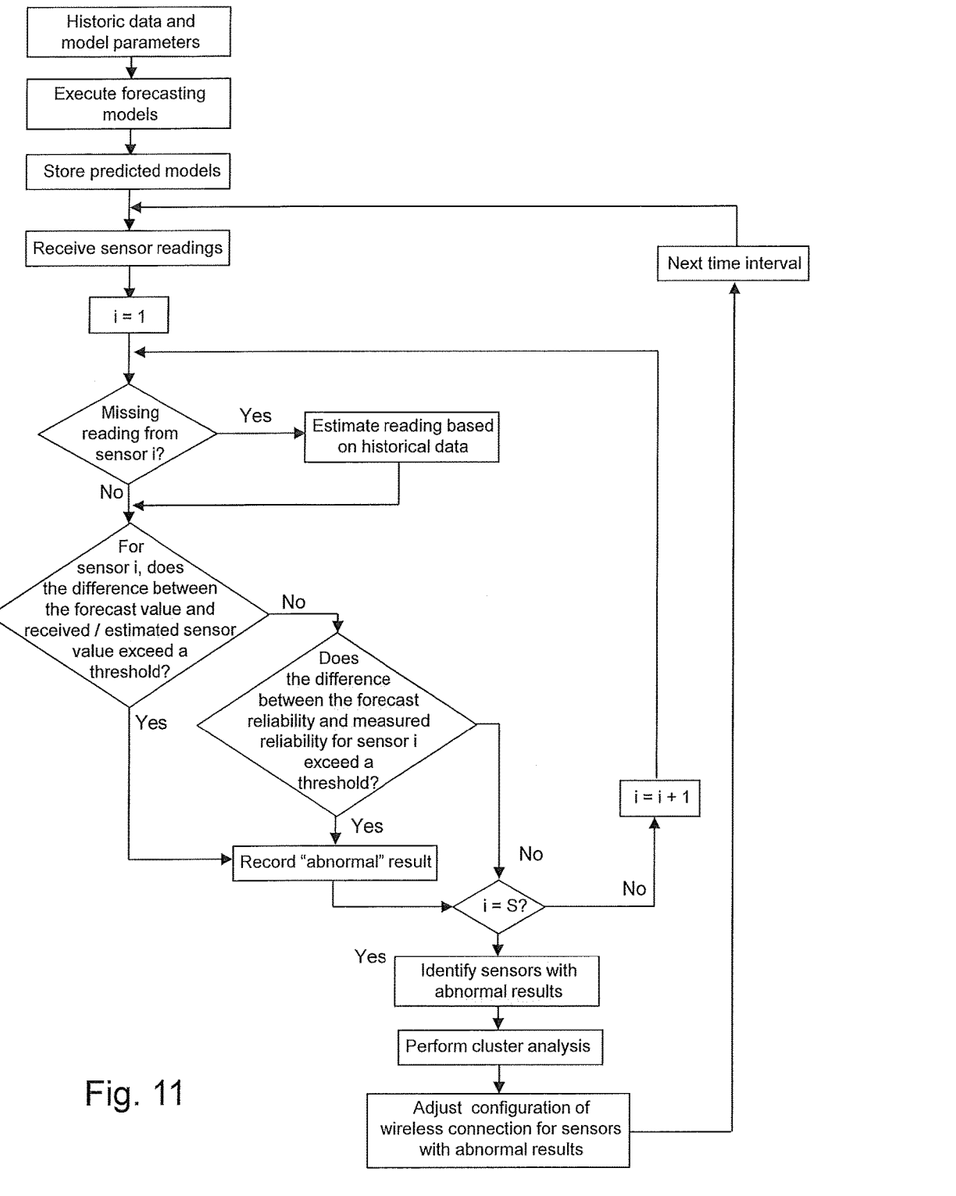
FIG. 11 shows a flow chart of steps carried out in accordance with another embodiment.

FIG. 10 shows a flow chart of steps as may be performed by the transmission control system according to a further embodiment. Here, in contrast to the previously described embodiments, the configuration of the different wireless connections is adjusted collectively, rather than being adjusted individually on a sensor by sensor basis.

As in the previous embodiments, the method commences by loading historic sensor data readings for the sensors into memory, together with the parameters used to generate the sensor readings forecasts and the performance forecasts for the wireless connections between the sensors and the data collection facility (steps S1001 to S1003).

In step S1004, a reading is received from a first one of the sensors and compared against the sensor readings forecast, to determine the value of the normality parameter for the sensor (step S1005). In this instance, if the difference between the received reading and the forecast value is above a threshold, the method proceeds to step S1006 in which an "abnormal result" is recorded for the sensor in question. At the same time, the reliability of the wireless communication link between the sensor and the data collection facility is computed and recorded.

In the event that the difference between the received sensor reading and the forecast value is found not to exceed the threshold defined in step S1005, the method proceeds to step S1007. Here, the reliability of the wireless communication link between the sensor and the data collection facility is computed and compared against the reliability that is forecast based on the current configuration of that link. If the measured reliability is deemed to be consistent with the forecast, no action is taken. However, if the measured reliability is determined to fall short of the forecast reliability, an "abnormal result" is again recorded for the sensor (step S1006). In this case, the "normality" reading as determined in step S1005 is also recorded alongside the measured reliability of the wireless communication link.

It will be seen, therefore, that each "abnormal result" comprises a pair of values, one of which is the normality determined for the sensor reading in question, and the second one of which is the reliability for the link between the sensor and the data collection facility. Note that only one of the two values need be anomalous in order to record an "abnormal result"; even if the sensor reading is consistent with the value forecast by the sensor readings forecast model, the reliability of the link between the sensor and the data collection facility will still be computed and in the event that the reliability is found to fall short of expectations, both the normality of the sensor reading and the reliability will be recorded. Similarly, if the sensor reading is found to deviate significantly from the forecast value, both the normality of the sensor reading and the reliability of the communication link will be recorded, even if the reliability is found to be within expectations for the present configuration of the wireless communication link.

Once steps S1005 to S1007 have been completed for each one of the sensors i=1 . . . S, the method proceeds to steps S1008 and S1009, in which a cluster analysis is performed for sensors identified as having abnormal results. In one example, the cluster analysis is performed using a fuzzy-c-means clustering, which has been used in previous approaches for intrusion anomaly detection. Here, the algorithm is used to determine the membership of events (and missing events) to different combined normality/reliability states. The basic principle is that discrete event classification, using the various models permits a combined determination of the anomalous events. The classification states represent different groups of similar measurement normality. Each measurement has a membership to each group, or associated probabilities of occurring, where the sum of all probabilities for all classes is 1. It is desirable that when anomalous events occur they should fall within a low severity group, meaning that the reliability of the prediction and the time taken to detect the anomaly is better.

For the purpose of explanation, it will be assumed in the present example that the system is one based on water consumption metering using Automatic Meter Reading (AMR) devices, with the AMR sensors being connected via a short range radio network infrastructure. The sensors report readings to the data collection facility for processing and use to assist decision support systems, such as demand planning, pressure management and leakage detection. As the radio infrastructure operates in the 868 MHz or ISM bands it is susceptible to interference and propagation anomalies (such as building, meter pit and vehicle related attenuation) which vary over time and space and may result in missing readings.

Figure 12:
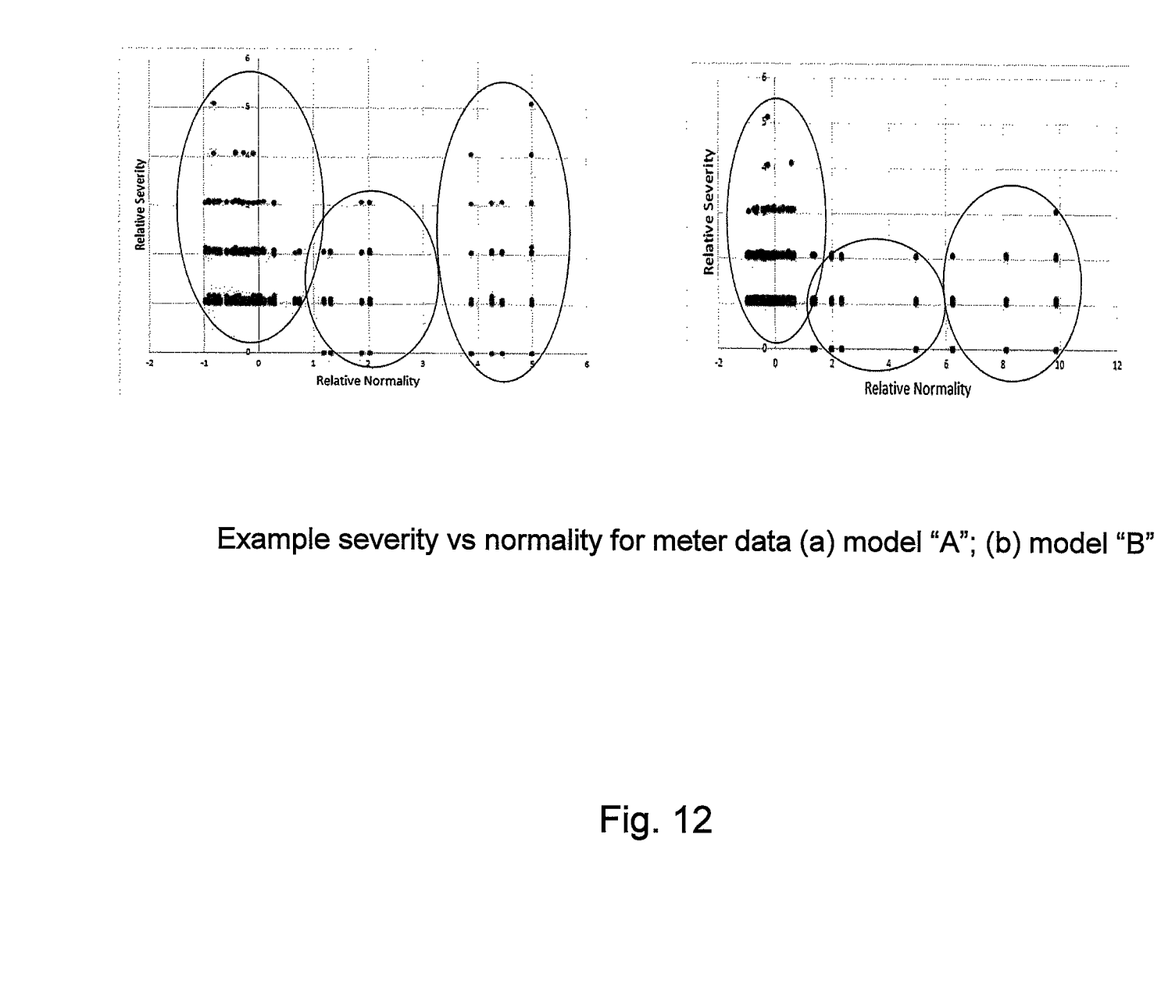
FIG. 12 shows an example of cluster analysis as used in selecting an appropriate wireless network configuration for a decision support system in accordance with an embodiment.

The normality and reliability of the individual abnormal events are clustered by defining a set of classification states. FIG. 12 indicates two different examples, corresponding to sensor readings obtained at different times of the week, and hence having been compared against different sensor reading forecast models. It will be understood here that the term "severity" as used to label the ordinate axis defines the inverse of the reliability. In both examples, the number of classification states is set as 3, with the 3 clusters representing the most probable states for the individual readings/events.

In both graphs, the cluster furthest to the right is the most important for anomaly detection and is used to identify whether or not in particular whether the severity of the cluster centre is too high. By identifying each abnormal result in the graph with its respective sensor, it is possible to ascertain whether the clusters relate to a particular geographic region of the sensor network; for example, if the right hand cluster is comprised mainly of sensors located in a single region, an inference can be made about the performance of the network in that region as a whole, rather than on an individual sensor-by-sensor basis. Accordingly, the reporting of data from those sensors can be optimised collectively, by diverting additional power or bandwidth to the entire region, for example. Treating the sensors in such a collective fashion can simplify the overall process of adapting the wireless network configuration to provide the necessary reliability and predictability for detecting anomalies in the sensor readings.

It will be appreciated that implementations of the subject matter and the operations described in this specification, including those carried out by the transmission control system, for example, can be realized in digital electronic circuitry, or in computer software, firmware, or hardware. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

While certain embodiments have been described, these embodiments have been presented by way of example only and are not intended to limit the scope of the invention. Indeed, the novel methods, devices and systems described herein may be embodied in a variety of forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

The invention claimed is:

1. A method for managing the configuration of a wireless connection used to transmit sensor readings from a sensor to a data collection facility, the method comprising:
    (i) receiving a sensor reading from the sensor;
    (ii) comparing the value of the sensor reading with a forecast value for the sensor reading;
    (iii) determining the value of a normality parameter for the sensor, wherein the value of the normality parameter defines the extent to which the value of the sensor reading differs from the forecast value; and
    (iv) determining whether to retain or change a current configuration of the wireless connection between the sensor and data collection facility, wherein the determination to retain or change the current configuration is based at least in part on the value of the normality parameter and includes obtaining a reliability forecast for the current configuration of the wireless connection, the reliability forecast indicating the likelihood of delays in receiving subsequent sensor readings from the sensor.

2. A method according to claim 1, comprising carrying out the steps (i) to (iv) for each one of a plurality of sensors.

3. A method according to claim 1, wherein changing the configuration comprises adjusting at least one of the bandwidth and power allocated to the wireless connection between the sensor and the data collection facility.

4. A method according to claim 1, wherein changing configuration comprises re-routing communication between the sensor and data collection facility, and routing sensor readings to the data collection facility via a different path in a wireless communication network.

5. A method according to claim 1, wherein changing configuration comprises utilising a different frequency, channel allocation or modulation scheme for the wireless connection.

6. A method according to claim 1, wherein changing configuration comprises changing the reporting interval for the sensor readings.

7. A method according to claim 1, wherein the sensor readings comprise measures of utility usage at one or more locations.

8. A non-transitory computer readable medium comprising computer executable instructions that when executed by one or more computer processors will cause the computer to carry out a method according to claim 1.

9. A computer system comprising:
one or more processors; and
a non-transitory computer readable medium comprising computer executable instructions that when executed by the one or more computer processors will cause the computer to carry out a method according to claim 1.

10. A method for managing the configuration of a wireless connection used to transmit sensor readings from a sensor to a data collection facility, the method comprising:
(i) receiving a sensor reading from the sensor;
(ii) comparing the value of the sensor reading with a forecast value for the sensor reading;
(iii) determining the value of a normality parameter for the sensor, wherein the value of the normality parameter defines the extent to which the value of the sensor reading differs from the forecast value; and
(iv) determining whether to retain or change a current configuration of the wireless connection between the sensor and data collection facility, wherein the determination to retain or change the current configuration is based at least in part on the value of the normality parameter and includes determining the value of a reliability parameter for the connection by comparing an arrival time of the sensor reading with a forecast arrival time, the reliability parameter defining the extent to which the arrival time differs from the forecast arrival time.

11. A method according to claim 10, wherein in the event that the normality parameter indicates that the difference between the value of the received sensor reading and the forecast value for the sensor reading is above a first threshold, and the reliability parameter indicates that the difference between the arrival time of the sensor reading and the forecast arrival time is above a second threshold, the configuration of the wireless connection is changed.

12. A method for managing the configuration of a wireless connection used to transmit sensor readings from a sensor to a data collection facility, the method comprising:
(i) receiving a sensor reading from the sensor;
(ii) comparing the value of the sensor reading with a forecast value for the sensor reading;
(iii) determining the value of a normality parameter for the sensor, wherein the value of the normality parameter defines the extent to which the value of the sensor reading differs from the forecast value;
(iv) determining whether to retain or change a current configuration of the wireless connection between the sensor and data collection facility, wherein the determination to retain or change the current configuration is based at least in part on the value of the normality parameter;
forecasting arrival times for subsequent sensor readings from the sensor;
in the event that one or more of the sensor readings are not received at the forecast times, estimating value(s) for the sensor readings that have not been received, the estimated readings being based on the values of the last sensor readings to have been received from the sensor; and
carrying out steps (ii) to (iv) on the basis of the estimated sensor value(s).

13. A method for managing the configuration of a wireless connection used to transmit sensor readings from a sensor to a data collection facility, the method comprising:
(i) receiving a sensor reading from the sensor;
(ii) comparing the value of the sensor reading with a forecast value for the sensor reading;
(iii) determining the value of a normality parameter for the sensor, wherein the value of the normality parameter defines the extent to which the value of the sensor reading differs from the forecast value;
(iv) determining whether to retain or change a current configuration of the wireless connection between the sensor and data collection facility, wherein the determination to retain or change the current configuration is based at least in part on the value of the normality parameter;
carrying out the steps (i) to (iv) for each one of a plurality of sensors,
wherein the respective wireless connections between the sensors and the data collection facility comprise part of a wireless network, and the method further comprises:
identifying those sensors for which at least one of:
the difference between the value of the received sensor reading and the forecast value for the sensor reading is above a first threshold, and
the difference between the arrival time of the sensor reading and a forecast arrival time is above a second threshold;
for each identified sensor, logging the value of the normality value and a reliability parameter, wherein the value of the reliability parameter defines the extent to which the arrival time differs from the forecast arrival time;
identifying, based on the logged values, one or more regions in the wireless network that include multiple sensors whose wireless connection to the data collection facility requires a change in configuration; and
adjusting the configuration of the wireless network in the one or more regions to effect the changes to the wireless connections of said multiple sensors.

14. A method according to claim 13, wherein identifying the one or more regions in the wireless network comprises performing a clustering algorithm on the logged values; and identifying geographic regions associated with the clusters of logged values.

15. A method for managing the configuration of a wireless connection used to transmit sensor readings from a sensor to a data collection facility, the method comprising:
(i) receiving a sensor reading from the sensor;
(ii) comparing the value of the sensor reading with a forecast value for the sensor reading;

(iii) determining the value of a normality parameter for the sensor, wherein the value of the normality parameter defines the extent to which the value of the sensor reading differs from the forecast value;
(iv) determining whether to retain or change a current configuration of the wireless connection between the sensor and data collection facility, wherein the determination to retain or change the current configuration is based at least in part on the value of the normality parameter,
wherein changing the configuration of a wireless connection comprises selecting a configuration having a higher reliability forecast than that of the current configuration, the reliability forecast indicating the likelihood of delays in receiving subsequent sensor readings from the sensor when using a particular configuration.

* * * * *